United States Patent [19]

Matsui et al.

[11] Patent Number: 4,958,180
[45] Date of Patent: Sep. 18, 1990

[54] FOCUS DETECTING DEVICE AND AUXILIARY ILLUMINATING DEVICE THEREFOR

[75] Inventors: Toru Matsui; Hiroshi Ueda, both of Osaka, Japan

[73] Assignee: Minolta Camera Kabushiki Kaisha, Osaka, Japan

[21] Appl. No.: 196,290

[22] Filed: May 20, 1988

[30] Foreign Application Priority Data

May 23, 1987 [JP] Japan .................................. 62-125027
May 23, 1987 [JP] Japan .................................. 62-125028
May 23, 1987 [JP] Japan .................................. 62-125029

[51] Int. Cl.$^5$ ........................... G03B 3/00; G01J 1/00
[52] U.S. Cl. ................................ 354/403; 250/495.1; 250/504 R; 250/201.4
[58] Field of Search ...................... 354/403, 408, 289.1; 356/1, 4; 250/201 AF, 237 R, 237 G, 494.1, 495.1, 503.1, 504 R; 357/75

[56] References Cited

U.S. PATENT DOCUMENTS

4,544,252 10/1985 Tsukamoto ...................... 354/289.1
4,801,963  1/1989 Koyama et al. .................... 354/403

Primary Examiner—W. B. Perkey
Attorney, Agent, or Firm—Burns, Doane, Swecker & Mathis

[57] ABSTRACT

A focus detecting device for detecting a focus condition of a photographic lens by receiving light coming from a plurality of focus detecting area and auxiliary illuminating device therefor. The illuminating device is provided with a light source, a projection pattern disposed just before the light source for providing a sufficient contrast onto an object and a projection lens. The light source is composed of plural condenser lenses arranged in a row and plural light emitting elements arranged behind the condenser lenses at intervals wider than the spacing of adjacent condenser lenses, whereby an object of a wide range is illuminated uniformly. The projection pattern comprises small-size patterns suitable for photographic lenses of long focal lengths, arranged centrally of the projection pattern, and large-size patterns suitable for photographic lenses of short focal lengths, arranged in the outer peripheral portion of the projection pattern. Further, the projection pattern has a curved shape to compensate astigmatism characteristics of the projection lens.

10 Claims, 9 Drawing Sheets

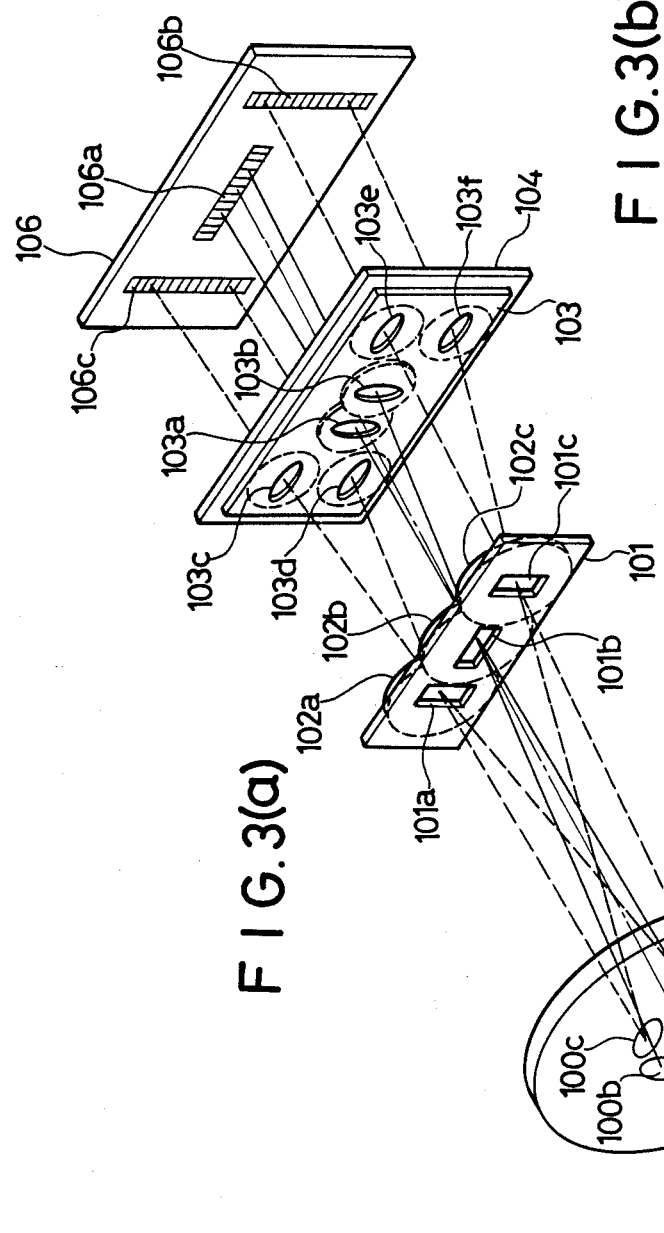

FOCUS DETECTING DEVICE AND AUXILIARY ILLUMINATING DEVICE THEREFOR

BACKGROUND OF THE INVENTION

1. Field of the Invention

The present invention relates to a focus detecting device for detecting a focus condition of a photographic lens and an auxiliary illuminating device therefor, and more particularly to a TTL type focus detecting device which detects the focus condition of the photographic lens by receiving light passed through the photographic lens, and an auxiliary illuminating device suitable therefor.

2. Description of the Prior Art

In such TTL type focus detecting device, it becomes difficult or impossible to detect the focus condition of the photographic lens, if an object to be focused is insufficient dark or has an insufficient low contrast. U.S. Pat. No. 4,690,438 proposes an auxiliary illuminating device attachable to a camera for illuminating the object with projecting a projection pattern to assert the focus detection in such a case.

On the other hand, a multi-area focus detecting device is recently proposed in which the focus condition of the photographic lens is detected with respect to a plurality of focus detecting areas. The plurality of focus detecting areas includes at least one axial focus detecting area located on an optical axis of the photographic lens and also at least one off-axial focus detecting area located away from the optical axis of the photographic lens. In such multi-area focus detecting device, the distance between the off-axial focus detecting area and the optical axis of the photographic lens is changed in accordance with the change of the focal length of the photographic lens. In details, the distance is increased in accordance with the decrease of the focal length of the photographic lens, and is decreased in accordance with the increase of the focal length thereof. Therefore, the auxiliary illuminating device must illuminate a wide range extending from the axial position to the off-axial position with projecting the projection pattern, if it is used with the multi-area focus detecting device.

However, the conventional auxiliary illuminating device can not illuminate the off-axial position with sufficient intensity of light for the focus detection, even if it can illuminate the axial position with a sufficient intensity of light. Therefore, the sufficient function of the multi-area focus detecting device can not be performed, if the object is too dark or has an insufficient low contrast.

Additionally, in the conventional auxiliary illuminating device, no consideration has been given to a focus condition of a projection pattern image formed on the off-axial focus detecting area. Here, if a projection lens, provided for projecting the projection pattern onto the object, is constructed by one single lens element, it becomes difficult to well correct the spherical aberration of the projection lens and the astigmatism thereof with keeping the good balance, although it would be possible to control only the spherical aberration thereof within a proper range by means of introducing one or two aspheric surfaces to the projection lens. If the spherical aberration is not corrected well, the projection pattern image is blurred on the object. On the other hand, if the astigmatism is not corrected well, the focus position of the projection pattern image formed away from the optical axis is deviated from that formed on the optical axis. It causes that the range of distance within which the sufficient contrast for the focus detection can be projected differs depending on the projection pattern. Both of the spherical aberration and the astigmatism may be corrected well by means of constructing the projection lens by a plurality of lens elements. However, such construction results in a complex construction and an increase in both size and manufacturing cost.

Furthermore, the resolving power of the focus detecting device is improved in accordance with the increase of the focal length of the photographic lens, since the size of the focus detecting area is decreased in accordance therewith. Contrary, the resolving power of the focus detecting device is deteriorated in accordance with the decrease of the focal length of the photographic lens, since the size of the focus detecting area is increased in accordance therewith. Therefore, if the auxiliary illuminating device is used with the multi-area focus detecting device, it is necessary for designing the projection pattern so that the sufficient contrast for the focus detection should be provided with respect to any focal length of the photographic lens. In the above-explained auxiliary illuminating device, a plurality of thick stripes arranged at a relatively long pitch and a plurality of fine stripes arranged at a relatively short pitch are mixed with each other to form a projection pattern to be projected. However, the performance of the multi-area focus detecting device has not been fully exhibited by such projection pattern, since no consideration has been given to such multi-area focus detecting device in the auxiliary illuminating device.

SUMMARY OF THE INVENTION

It is a primary object of the present invention to provide a focus detecting device in which focus detection of a photographic lens can be detected with respect to a plurality of focus detecting areas, even if the object to be focused is dark or has an insufficient low contrast.

It is another object of the present invention to provide a focus detecting device in which the auxiliary illumination can be performed over a wide range from an axial position located on the optical axis of the photographic lens to an off-axial position away from the optical axis thereof.

It is a further object of the present invention to provide a focus detecting device in which a projection pattern can be projected for providing a sufficient contrast for the focus detection onto an object over a wide range from an axial position located on the optical axis of the photographic lens to an off-axial position away from the optical axis thereof.

It is a still further object of the present invention to provide a focus detecting device in which a projection pattern can be projected for providing a sufficient contrast onto an object in correspondence to a plurality of focal lengths of a plurality of photographic lenses.

It is a still further object of the present invention to provide an auxiliary illuminating device suitable for multi area focus detecting device which detects a focus condition of as photographic lens with respect to a plurality of focus detecting areas including at least one axial focus detecting area located on the optical axis of the photographic lens and at least one off-axial focus detecting area located away from the optical axis thereof.

It is a still further object of the present invention to provide an auxiliary illuminating device for the focus detection, in which the auxiliary illumination can be performed over a wide range from an axial position located on the optical axis of the photographic lens to an off-axial position away from the optical axis thereof.

It is a still further object of the present invention to provide an auxiliary illuminating device for the focus detection, in which a projection pattern can be projected for providing a sufficient contrast for the focus detection onto an object over a wide range from an axial position located on the optical axis of the photographic lens to an off-axial position away from the optical axis thereof.

It is a still further object of the present invention to provide an auxiliary illuminating device for the focus detection, in which a projection pattern can be projected for providing a sufficient contrast onto an object in correspondence to a plurality of focal lengths of a plurality of photographic lenses.

The above and other objects and features of the present invention will become apparent from the following detailed description and the accompanying drawings.

BRIEF DESCRIPTION OF THE DRAWINGS

FIGS. 3(a) and (b) are constructional explanatory views of a focus detecting optical system;

FIG. 13 shows a front view of the light emitting unit and FIG. 14 shows a side view thereof.

DETAILED DESCRIPTION OF THE PREFERRED EMBODIMENTS

Figure 1:
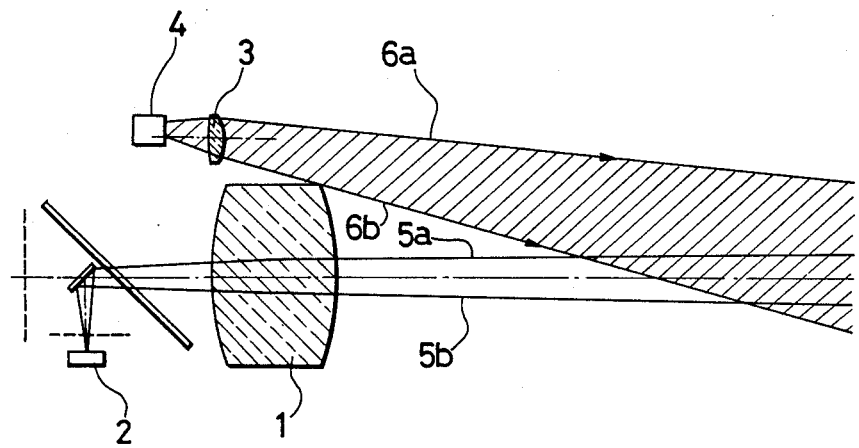
FIG. 1 is a diagram explanatory of the principle of an active type automatic focus detecting system.

Embodiments of the present invention will now be described. FIG. 1 is a diagram explanatory of the principle of an active type automatic focus detecting system (hereinafter referred to as "active AF") in which an auxiliary light is projected from a camera side toward an object side and focus detection is made using the light reflected from the object. In the figure, numeral 1 denotes a photographic lens attached to the camera body replaceably; numeral 2 denotes a focus detecting module provided within the camera body; numeral 4 denotes an auxiliary illuminating light source for focus detection; and numeral 3 denotes a projection lens. Illuminating light emitted from the auxiliary illuminating light source 4 is converged and projected to an object by the projection lens 3. The width of the projected light flux is as indicated by 6a and 6b. On the other hand, numerals 5a and 5b indicate a focus detection range of the active AF. Out of the light reflected from the object, the portion defined by 5a and 5b passes through the photographic lens 1 and is incident on the focus detecting module 2 for use in focus detection.

Figure 2:
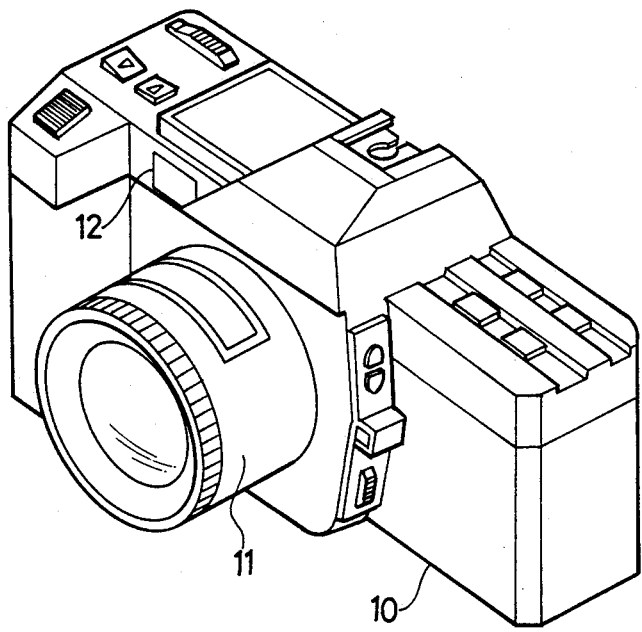
FIG. 2 is a perspective view of a camera which contains an active type automatic focus detecting system.

FIG. 2 shows an appearance of the camera which contains the active AF of the above principle. A window 12 for projecting the auxiliary illuminating light to an object is formed in the camera body indicated by numeral 10.

FIG. 3 is a constructional explanatory view of a focus detecting optical system having a plurality of focus detecting areas. In FIG. 3(a), numeral 11 denotes a photographic lens and numerals 100a to 100d represent areas of passing therethrough of focus detecting light beams on the exit pupil of the photographic lens 11. Numeral 101 denotes a focus detecting area mask disposed just after a predetermined focal plane (not shown) of the photographic lens. As shown in the figure, three apertures 101a, 101b and 101c are formed in the area mask 101, defining three focus detecting areas on the photographic image plane. The aperture 101b is provided approximately centrally of the image plane, while the apertures 101a and 101c are provided in other positions than the central part of the same plane. The three apertures 101a, 101b and 101c are rectangular, of which the aperture 101b is disposed so that its long side extends in the transverse direction, while the apertures 101a and 101c are disposed in positions symmetrical with respect to an optical axis OL of the photographic lens in parallel with the short side of the aperture 101b, that is, in a direction perpendicular to the aperture 101b. This arrangement is only one example, not constituting any limitation. Numerals 102a, 102b and 102c denote condenser lenses disposed just after the apertures 101a, 101b and 101c, respectively, functioning to inversely project the apertures 103a to 103f explained later onto the exit pupil of the photographic lens 11. Numeral 103 denotes an aperture mask, which is provided with six apertures 103a to 103f. The apertures 103a and 103b are projected respectively to 100a and 100b on the exit pupil of the photographic lens 11 by the condenser lens 102b; the apertures 103c and 103d are projected respectively to 100d and 100c on the exit pupil of the photographic lens 11 by the condenser lens 102a; and the apertures 103e and 103f are projected respectively to 100d and 100c on the exit pupil of the photographic lens 11 by the condenser lens 102c. Thus, the apertures 103a to 103f function to determine focus detecting light areas in the exit pupil of the photographic lens 11.

Just after the aperture 103 is disposed such a focusing optical member 104 as shown in FIG. 3(b). The optical member 104 is formed with six re-imaging lenses 104a to 104f which are disposed in the optical paths through the apertures 103a to 103f, respectively. The re-imaging lenses 104a to 104f operate to form re-images of the images which have been formed on and near the focal plane by the photographic lens 11, onto sensors 106a and 106b and 106c of a later-described light sensing portion 106 for focus detection.

The light sensing portion 106 for focus detection is composed of one-dimensional (line) sensors 106a, 106b and 106c, e.g. CCDs. The sensor 106a is disposed in a position to sense the image formed by the re-imaging lenses 104a and 104b; the sensor 106b is disposed in a position to sense the image formed by the re-imaging lenses 104e and 104f; and the sensor 106c is disposed in a position to sense the image formed by the re-imaging lenses 104c and 104d. That is, the sensors 106a, 106b and 106c are arranged in the same directions as the arranged directions of the pair of the apertures 103a, 103b; 103e, 103f; and 103c, 103d, respectively. For example, the images focused respectively through the apertures 103a and 103b are formed to standard and reference portions on the sensor 106a, so a focus condition of the photographic lens can be detected by obtaining correlation of the output of the standard portion and that of the reference portion of the sensor 106a.

The pair of apertures 103a and 103b are arranged along the longitudinal direction of the aperture 101b; the pair of apertures 103c and 103d are arranged along the longitudinal direction of the aperture 101a; and the pair of apertures 103e and 103f are arranged along the longitudinal direction of the aperture 101c, so that the extending direction of the sensor 106a and that of the sensors 106b and 106c are different from each other at an angle of 90°. Since the sensor 106a is disposed in the transverse direction, it has a focus detecting ability for an object having a lateral contrast, while the sensors 106b and 106c are arranged in the vertical direction, so they have a focus detecting ability for an object having a vertical contrast.

Figure 4:
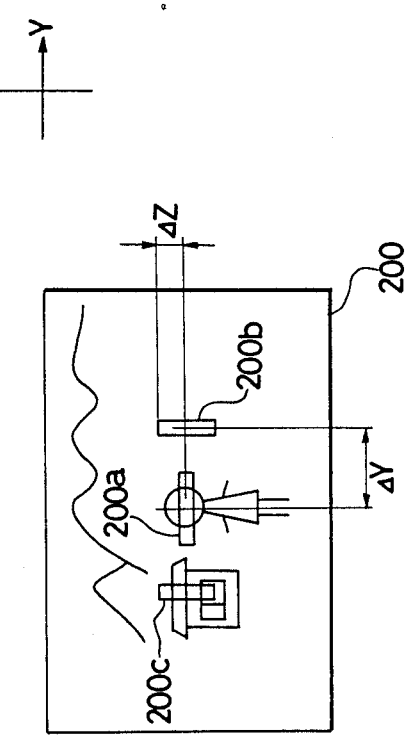
FIG. 4 is a diagram showing a finder field image.

FIG. 4 shows a finder field image of the camera, in which the numeral 200 represents the whole of the photographic area to be photographed and the areas indicated by 200a, 200b and 200c represent focus detecting areas which are in corresponding relation to the light sensing surfaces of the sensors 106a, 106b and 106c.

An embodiment of a projecting optical system according to the present invention will be explained below.

Figure 5:
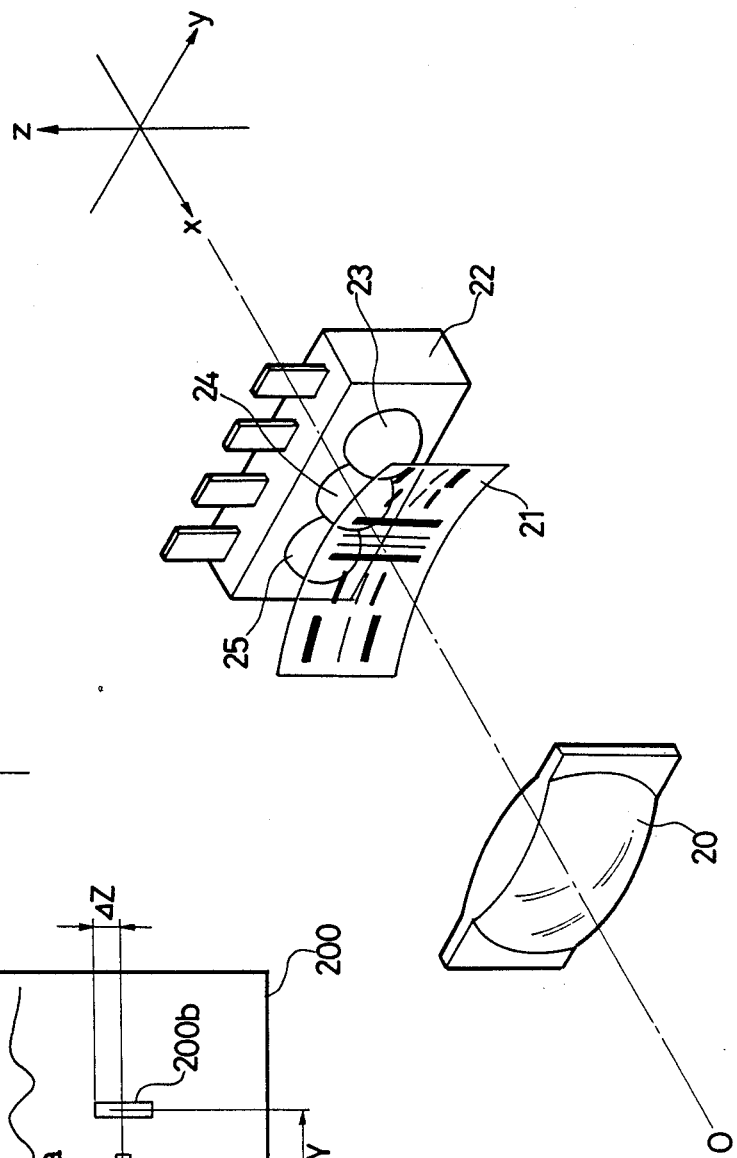
FIG. 5 is a constructional explanatory view of a projecting optional system.
Figure 6A:
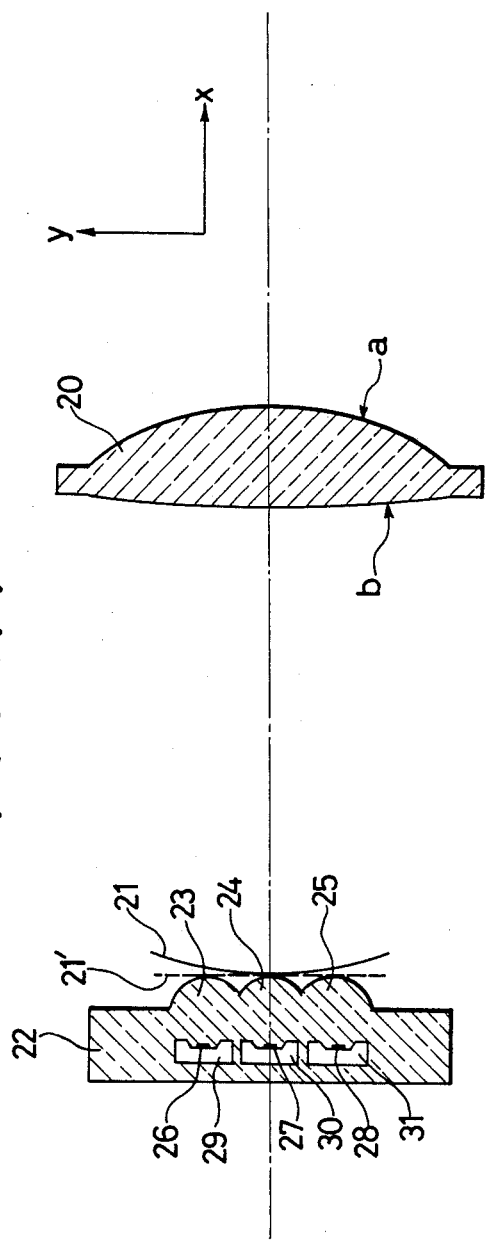
FIGS. 6(a) and (b) are sectional views taken along XY and XZ planes, respectively, in the projecting optical system.

FIG. 5 is a constructional explanatory view of the projecting optical system and FIGS. 6(a) and (b) are sectional views taken along XY and XZ planes shown in FIG. 5. In these figures, numeral 20 denotes a projection lens and numeral 21 denotes a projection pattern formed as a curved surface. Numeral 22 denotes a light emitting unit composed of three light emitting diodes (LEDs) 26, 27 and 28, cup frames 29, 30 and 31 disposed behind the LEDs and having reflective surfaces concave to the object side for conducting the light emitted by the LEDs efficiently to condenser lenses, and condenser lenses 23, 24 and 25 disposed in front of the LEDs. The projection pattern 21 has a light transmitting portion and a light non-transmitting portion, functioning to project a pattern onto an object to provide a light and shade contrast thereto. The projection lens 20 has a surface a formed as an aspherical surface to correct spherical aberration and a surface b formed as a spherical surface. But this does not constitute any limitation. The surfaces b and a may be aspherical and spherical, respectively, or both surfaces a and b may be aspherical to reduce spherical aberration.

Figure 7:
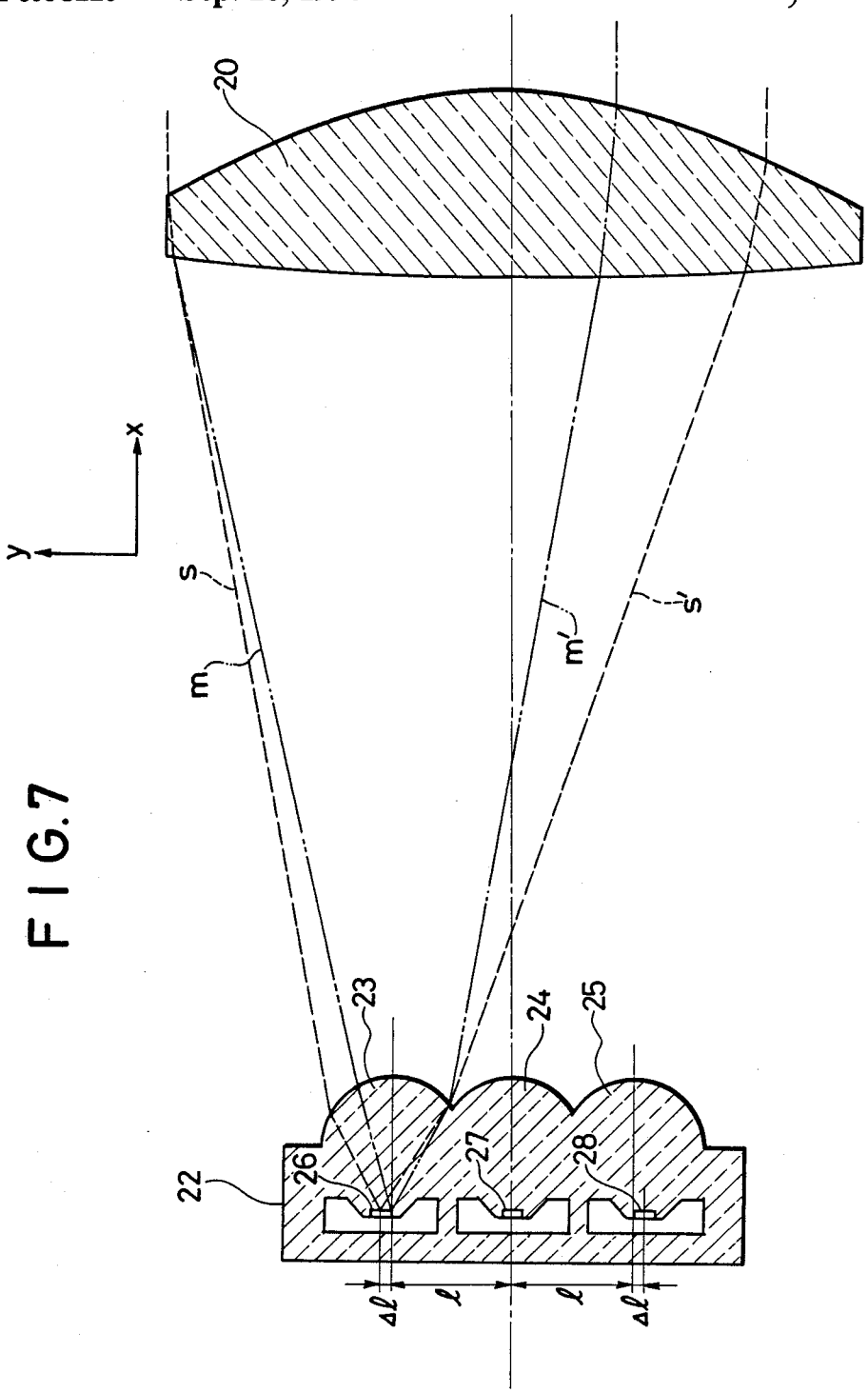
FIG. 7 is a sectional view taken along XY plane of a light emitting unit in the projecting optical system.
Figure 8:
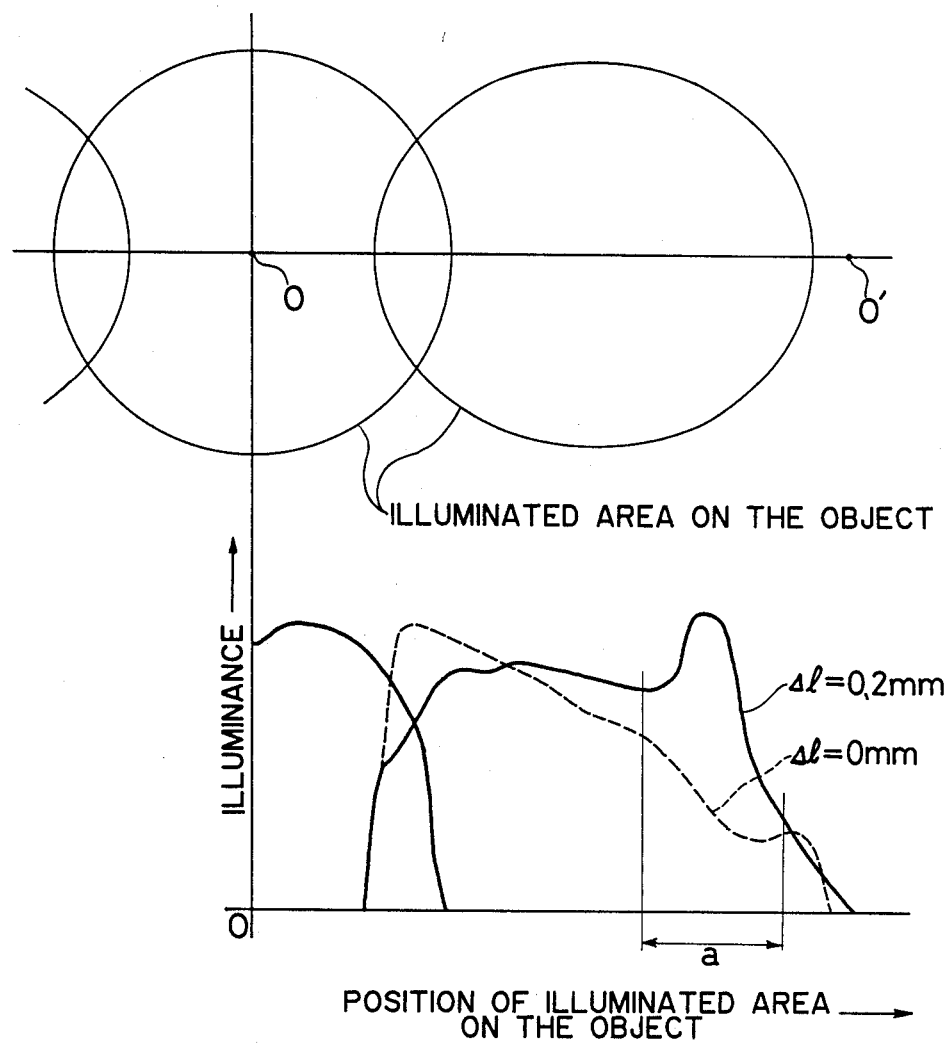
FIG. 8 is a diagram explanatory of changes in illuminance on an object.

The details of the construction of the light emitting unit 22 will now be explained with reference to FIG. 7. The three condenser lenses 23, 24 and 25 are disposed horizontally at interval of l, while the three LEDs 26, 27 and 28 located therebehind are disposed at wider interval of $l+\Delta l$. Such a wider spacing of the condenser lenses than that of the LEDs is for preventing the lowering in illuminance of an object located off the optical axis of the photographic lens. Where the condenser lenses and the LEDs are disposed at the same interval of l, the light emitted from the center of the light emitting diode 26 is within the range indicated by mm'. On the other hand, where the LEDs are disposed at wider interval of $l+\Delta l$ than the interval l of the condenser lenses, the light emitted from the center of the light emitting diode 26 is within the range indicated by ss' and thus the range of projection is wider than that in the former case.

Where the difference in interval, $\Delta l$, between the condenser lenses and the LEDs is varied, the illuminance on the object changes as shown in FIG. 8. More particularly, when $\Delta l = 0$, there lowers the illuminance of a portion a corresponding to both right and left side focus detecting areas which are used when a photographic lens of a short focal length is attached to the camera, out of the focus detecting areas on the object, and it becomes impossible to effect focus detection. But when $\Delta l = 0.2$ mm, the illuminance of the portion a does not lower and it is possible to effect focus detection.

Figure 6B:
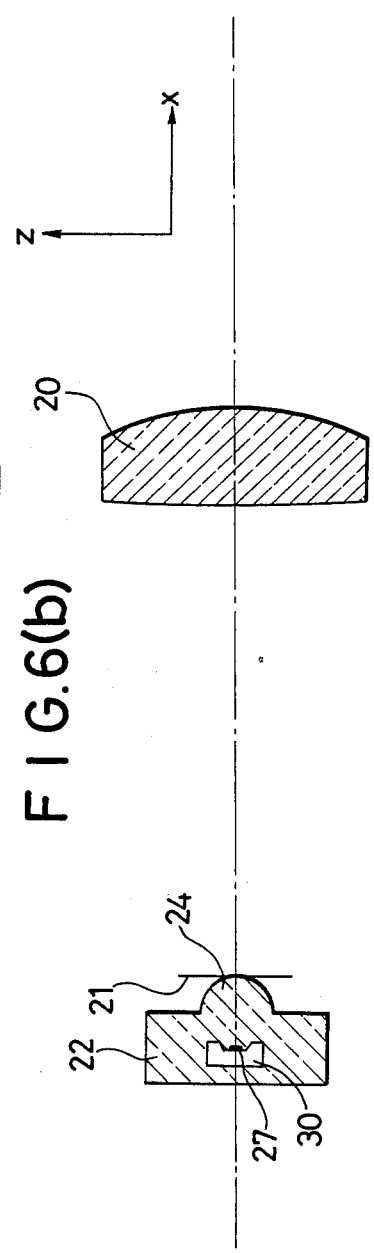
Figure 9:
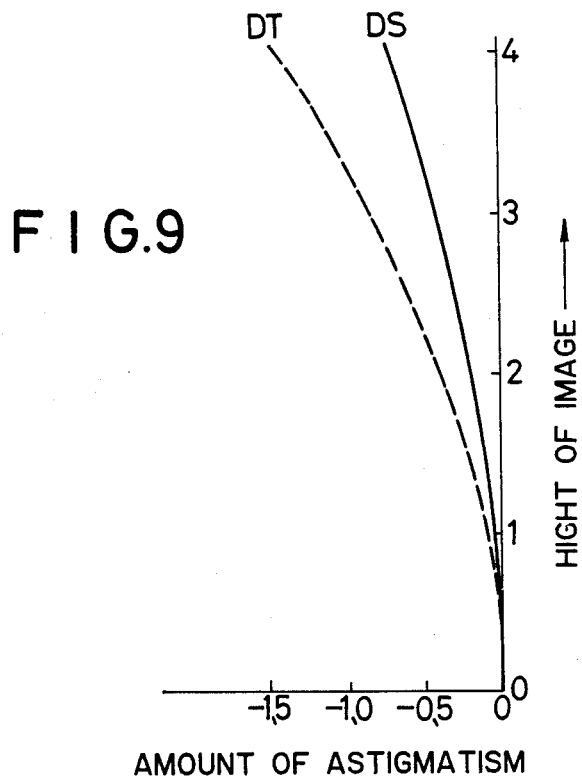
FIG. 9 is a lens astigmatism characteristic diagram.
Figure 10:
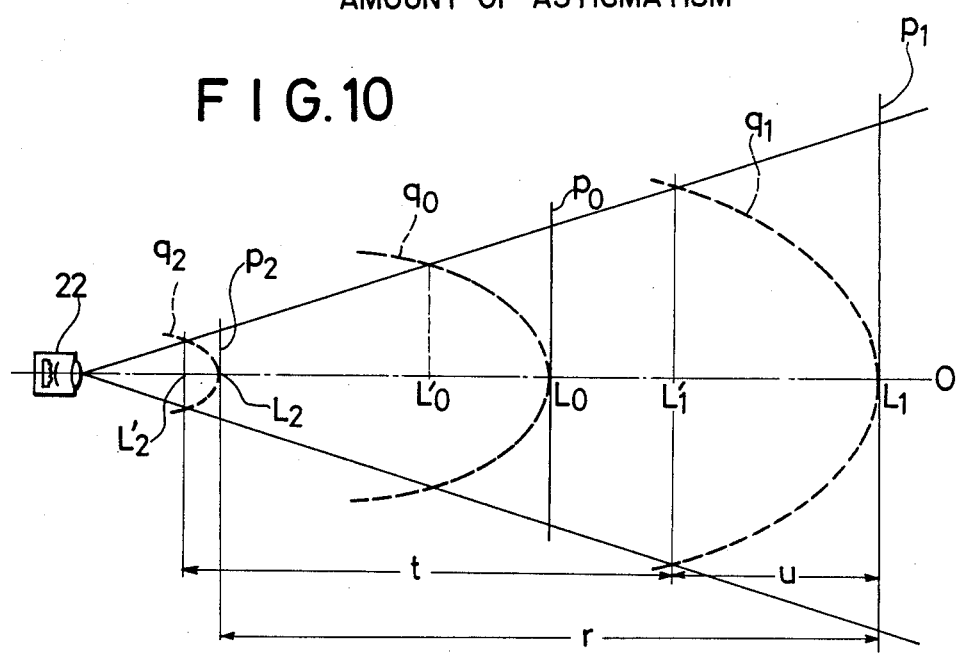
FIG. 10 is a diagram explanatory of focused positions of curved and planar projection patterns.

Explanation will now be made about the construction wherein the projection pattern 21 is formed as a curved surface. Astigmatism of the projection lens 20 exhibits, for example, such aberration characteristics as shown in FIG. 9, in which the longer the distance from the optical axis, the larger the aberration in a sagittal direction (DS direction) and that in a meridional direction (DT direction). This means that when the projection pattern is formed as a plane such as that indicated at 21' in FIG. 6, the projected position of the projection pattern on an object differs between on- and off-optical axis of the projection lens. FIG. 10 is an explanatory view of projected positions of the projection pattern with respect to the case where the projection pattern is formed as a plane and the case where it is curved according to amounts of astigmatism of the projection lens 20. If an image of a planar projection pattern 21' is focused at point $L_0$ on the optical axis O, the focused position of the image changes in accordance with the distance from the optical axis O because of the astigmatism of the projection lens 20 as shown by a dotted line $q_0$. Therefore, even if the focus detecting device is capable of detecting the focus condition of the photographic lens with respect to an object located within a distance range r between $L_1$ and $L_2$ on the optical axis O of the projection lens 20 by using the projected pattern, the distance range r is reduced to t in the off-axial position, since the points $L_1$ and $L_2$ is changed to $L_1'$ and $L_2'$ in accordance with the distance from the optical axis along dotted lines $q_1$ and $q_2$, respectively. This is caused by the astigmatism of the projection lens 20.

On the other hand, if an image of a projection pattern 21 curved in accordance with the astigmatism of the projection lens 20, the focused position of the image does not change in accordance with the distance from the optical axis O as shown by a solid line $P_0$. In such a case, the focus detecting device is capable of detecting the focus condition of the photographic lens with respect to an object located within a distance range r in both axial and off-axial positions, since the points $L_1$ and $L_2$ are not changed as shown in solid lines $P_1$ and $P_2$. Therefore, the detectable distance range is extended from t to r in the off-axial position by using the projection pattern curved in accordance with the astigmatism of the projection lens 20. Although astigmatism characteristics of the projection lens differ between sagittal (DS) and meridional (DT) directions, there may be made selection according to the contrast detecting direction of the focus detecting area located off the optical axis. In the focus detecting system shown in FIG. 3, sagittal direction is appropriate. As to Z direction, it is not necessary to curve the projection pattern because the passing height of light beam off the optical axis is not so large as in Y direction and the projection pattern is not so greatly influenced by astigmatism. This will now be explained with reference to FIG. 4 which shows a finder image. The height, $\Delta Z$, in Z direction from the optical axis is smaller than the height, $\Delta Y$, in Y direction from the same axis, so the projection pattern is not greatly influenced by astigmatism of the projection lens in Z direction but since $\Delta Y$ is under the influence of the astigmatism, it is necessary to curve the projection pattern in Y direction.

Figure 11:
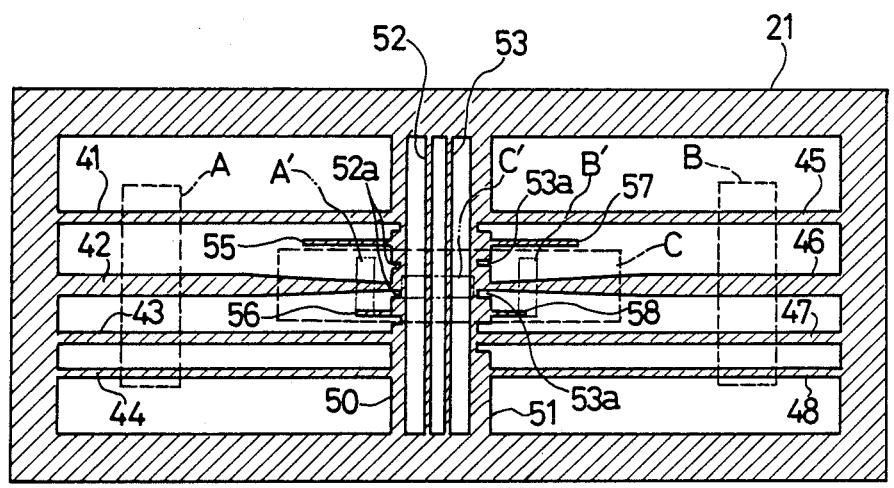
FIGS. 11 and 12 are plan views of first and second examples of projection patterns.

The projection pattern will now be explained. FIG. 11 shows an example of a projection pattern, in which hatched and white portions represent light non-transmitting and transmitting portions, respectively. Further, when the focus detecting areas on an object are projected reversely on the projection pattern, their positions correspond to areas A, B and C indicated by dotted lines in the same figure in the case where, for example, a wide angle lens of a focal length f=28 mm is attached to the camera. The focus detecting areas A and B on both sides make focus detection possible with a light and shade contrast formed by stripe patterns 41, 42, 43, 44 and 45, 46, 47, 48 respectively of the projection pattern, while the central focus detecting area C makes focus detection possible with a light and shade contrast formed by thick stripe patterns 50 and 51 of the projection pattern. In the central focus detecting area C are also included fine stripe patterns 52 and 53 of the projection pattern, but because of a too high frequency for the focus detecting area C, it is impossible to effect resolution and a focus-detectable contrast cannot be formed.

When a telephoto lens of a focal length f=100 mm is attached to the camera, the positions of focus detecting areas correspond to areas A', B' and C' indicated by dot-dash lines in the figure. The focus detecting areas A' and B' on both sides make focus detection possible with a light and shade contrast formed by central fine portions of the stripe patterns 42 and 46 of the projection pattern, while the central focus detecting area C' makes focus detection possible with a light and shade contrast formed by the fine stripe patterns 52 and 53 of the projection pattern.

By notching the central stripe patterns 50 and 51 of the projection pattern to form fine light transmitting portions 52a and 53a, it is made possible to provide a focus-detectable contrast to the focus detecting areas located on both sides. The stripe patterns 55, 56, 57 and 58 on the projection pattern are provided to cope with changes in position of projection pattern images projected onto the focus detecting areas on an object due to a difference in subject distance caused by parallax between the light sensing optical system for focus detection and the projecting optical system located in an obliquely upper position with respect to the former (see FIG. 2).

Figure 12:
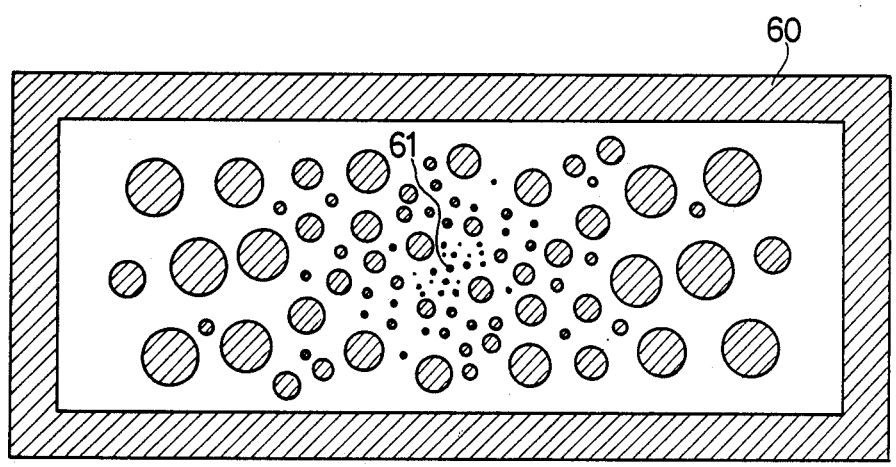

FIG. 12 shows a second example of a projection pattern comprising spotted patterns in place of the above stripe patterns. Patterns of small diameters are disposed at the center and thereabouts, while patterns of large diameters are disposed in the surrounding area, whereby there can be provided focus-detectable contrasts according to focal lengths of photographic lenses. The central circle 61 indicates the center of the projection pattern, which is used for positional adjustment for example.

As explained above, in forming a projection pattern, small-size patterns, having a relatively high spatial frequency, are disposed centrally of the projection pattern to conform to photographic lenses of relatively long focal lengths, while large-size patterns, having a relatively low spatial frequency, are disposed in the outer peripheral area of the projection pattern to conform to photographic lenses of relatively short focal lengths, whereby there can be obtained a projection pattern capable of providing contrasts sufficient to effect focus detection to various kinds of photographic lenses ranging from one having a long focal length to one having a short focal length.

Figure 13:
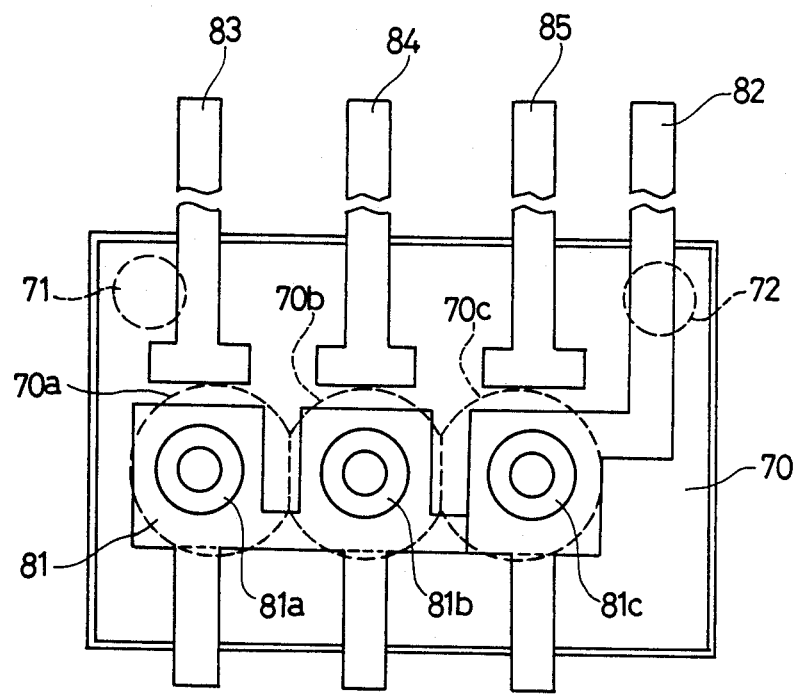
FIG. 13 and FIG. 14 show the other example of the light emitting unit shown in FIG. 5.
Figure 14:
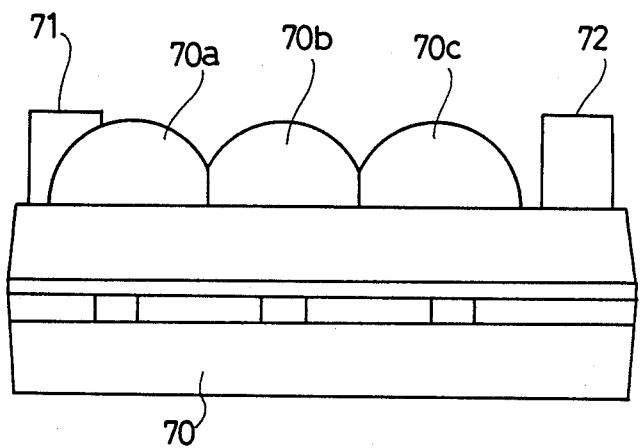

FIGS. 13 and 14 show the other example of the light emitting unit 22 shown in FIG. 5. FIG. 13 represents a front view of the light emitting unit, and FIG. 14 represents a side view thereof. In these figures, numeral 70 denotes a mold member made of a transparent synthetic resin material. On an upper surface of the mold member, there are provided three converging lenses 70a, 70b and 70c each of which has a hemispherical shape. The converging lenses 70a, 70b and 70c are arranged in a predetermined direction. Additionally, two bosses 71 and 72 are also formed on the upper surface of the mold member for positioning the light emitting unit to a predetermined position. Numeral 81 denotes a common frame having three concave cups 81a, 81b and 81c faced to the converging lenses 70a, 70b and 70c, respectively. Each of the concave cups 81a, 81b and 81c shapes a truncated cone configuration. Respective light emitting diodes (not shown) are located on the bottom of respective cups 81a, 81b and 81c. The common frame 81 operates as a common electrode of all of the light emitting diodes and as light reflecting members for reflecting light emitted by the light emitting diodes towards the object side. Therefore, one end of the common frame 81 projects from the mold member 70 for the electrical connection thereof. Numerals 83 to 85 denote frames connected to the light emitting diodes respectively. According to the example shown in FIGS. 13 and 14, it is possible to illuminate the object field more effectively, since the relative position, among the converging lenses, the concave cups and the light emitting diodes, can be adjusted precisely. This reason is that all of the cups are formed on a common frame.

Means for driving the auxiliary illuminating device for focus detection described above has no direct bearing on the present invention so will merely be outlined now. The camera provided with the auxiliary illuminating device for focus detection of the present invention has an automatic focus detecting system, which is provided with a photometric circuit for measuring a brightness of an object, an arithmetic control circuit and an LED driving circuit for driving the lighting LEDs incorporated in the auxiliary illuminating device of the present invention. The brightness of the object measured by the photometric circuit is inputted to the arithmetic control circuit. As a result, when it is judged to be lower than a predetermined reference level and in need of auxiliary lighting, an ON signal is provided to the lighting LEDs to turn on the latter. The details of this construction is disclosed in Japanese Patent Application No. 229313/86 filed by the applicant in the present case on Sept. 27, 1986.

Although in the above embodiment the auxiliary illuminating device for focus detection of the present invention is incorporated in the camera, it may be incorporated in an accessory such as, for example, a flash light device capable of being attached to the camera removably.

In the present invention, as set forth hereinabove, the projection pattern is curved in correspondence to astigmatism characteristics of the projection lens to attain coincidence in focal position of the projection pattern images projected onto an object on and off the optical axis of the photographic lens. Consequently, focus detection can always be made on and off the optical axis of the projection lens even upon change of focus detecting areas on the object caused according to whether the focal length of the projection lens used is long or short. Even under auxiliary illumination light the focus detecting system having a multi-divided focus detecting area can be allowed to function effectively.

On the optical axis of the projection lens, the center of the light emitting diode is disposed on the optical axis of the condenser lens, while off the optical axis of the projection lens, the center of the light emitting device is deviated a predetermined distance away from the optical axis of the projection lens rather than on the optical axis of the condenser lens, whereby the spread of light projected onto an object can be expanded. Consequently, even when the focus detecting areas on an object located off the optical axis of a photographic lens used are changed in position and size according to whether the focal length of the photographic lens is long or short, it is always possible to effect focus detection on and off the optical axis of the photographic lens.

Further, in the projection pattern used in the present invention, small-size patterns are disposed centrally, while large-size patterns are disposed in the outer peripheral portion, so when this projection pattern is projected onto an object, it is possible to provide focus-detectable contrasts to the focus detecting system according to varieties of photographic lenses ranging from one having a small focal length up to one having a large focal length.

What is claimed is:

1. Focus detecting device for detecting a focus condition of a photographic lens, comprising:
    light receiving means for receiving light coming from a plurality of focus detecting areas through the photographic lens to produce output signals used for detecting the focus condition of the photographic lens, said plurality of focus detecting areas including at least one axial focus detecting area located on an optical axis of the photographic lens and at least one off-axial focus detecting area located away from the optical axis of the photographic lens; and
    illuminating means for illuminating the plurality of focus detecting areas, including;
        light emitting means for emitting light; and
        contrast projecting means for projecting a predetermined projection pattern onto the plurality of focus detecting areas by the light emitted by the light emitting means, including a projecting pattern plate in which the predetermined projection pattern is formed, and a projection lens for projecting the predetermined projection pattern onto the plurality of focus detecting areas, said projection pattern plate being curved in accordance with characteristic of astigmatism generated by the projection lens.

2. Focus detecting device as claimed in claim 1, wherein the projection pattern plate is concave to the object side.

3. Focus detecting device for detecting a focus condition of a photographic lens, comprising:
    light receiving means for receiving light coming from a plurality of focus detecting areas to produce output signals used for detecting the focus condition of the photographic lens, said plurality of focus detecting areas including at least one horizontal focus detecting area extended in a horizontal direction and at least one vertical focus detecting area extended in a vertical direction; and
    contrast projecting means for projecting a horizontal projection pattern having a contrast in the horizontal direction onto the horizontal focus detecting area and for projecting a vertical projection pattern having a contrast in the vertical direction onto the vertical focus detecting area.

4. Focus detecting device as claimed in claim 3, wherein the contrast projecting means includes light emitting means for emitting light, a projection pattern plate in which the vertical and horizontal projection patterns are formed, and a projection lens for projecting the vertical and horizontal projection patterns onto the respective focus detecting areas.

5. Focus detecting device as claimed in claim 3, wherein either of the horizontal focus detecting area and the vertical focus detecting area of the light receiving means is located on the optical axis of the photographic lens, and the other thereof is located away from the optical axis.

6. Focus detecting device for detecting a focus condition of a photographic lens, comprising:
    light receiving means for receiving light coming from a plurality of focus detecting areas through the photographic lens to produce output signals used for detecting the focus condition of the photographic lens, said plurality of focus detecting areas including at least one axial focus detecting area located on an optical axis of the photographic lens and at least one off-axial focus detecting area located away from the optical axis of the photographic lens; and
    illuminating means for illuminating the plurality of focus detecting areas, including:
        a common frame having a plurality of concave portions, which is concave to the object side and arranged in a predetermined direction, a plurality of converging lenses located in front of the plurality of concave portions respectively, and a plurality of light emitting elements located in the plurality of concave portions of the common frame respectively.

7. F Focus detecting device as claimed in claim 6, wherein the plurality of light emitting elements are arranged along the predetermined direction at a first pitch, and the plurality of converging lenses are also arranged along the predetermined direction at a second pitch smaller than the first pitch.

8. Focus detecting device as claimed in claim 6, wherein the common frame operates as a common electrode of the plurality of light emitting elements.

9. Focus detecting device for detecting a focus condition of a photographic lens, comprising:
    light receiving means for receiving light coming from a plurality of focus detecting areas through the photographic lens to produce output signals used for detecting the focus condition of the photographic lens, said plurality of focus detecting areas including at least one axial focus detecting area located on an optical axis of the photographic lens and at least one off-axial focus detecting area located away from the optical axis of the photographic lens; and illuminating means for illuminating the plurality of focus detecting areas, including a plurality of light emitting elements arranged in a predetermined direction, and a plurality of converging lenses arranged along the predetermined direction, the positional relation between the plurality of light emitting elements and the plurality of converging lenses being determined so that all of the plurality of focus detecting areas are illuminated by an uniform light intensity.

10. Auxiliary illuminating device for using with a focus detecting device, comprising:

light emitting means for emitting light; and contrast projecting means for projecting a predetermined projection pattern onto the plurality of focus detecting areas by the light emitted by the light emitting means, including a projection pattern plate in which a predetermined projection pattern is formed, and a projection lens for projecting the predetermined projection pattern onto the object, said projection pattern plate being curved in accordance with characteristic of astigmatism generated by the projection lens.

* * * * *